Oct. 15, 1929.  D. K. BAXTER  1,731,521
ELECTRICAL APPARATUS
Filed June 23, 1923  4 Sheets-Sheet 4
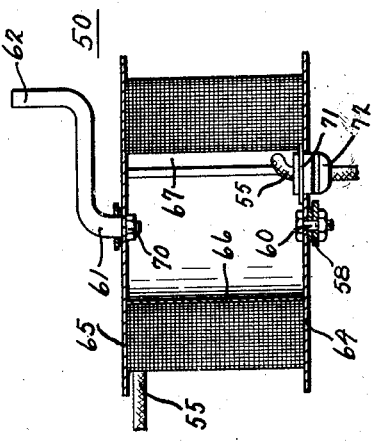
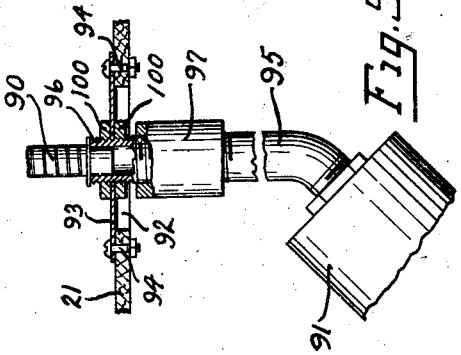
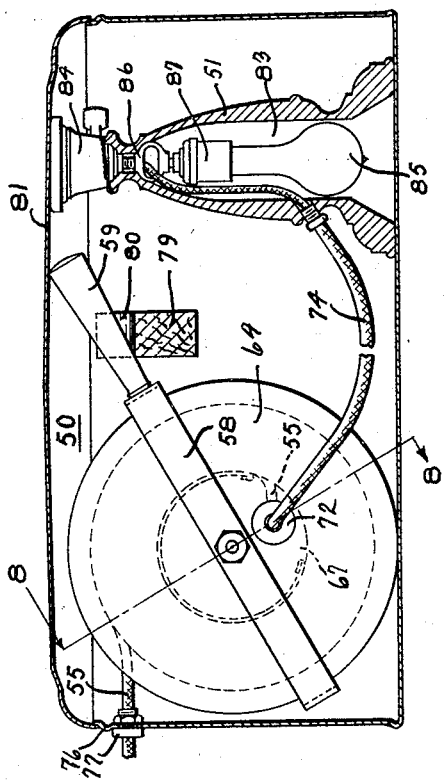
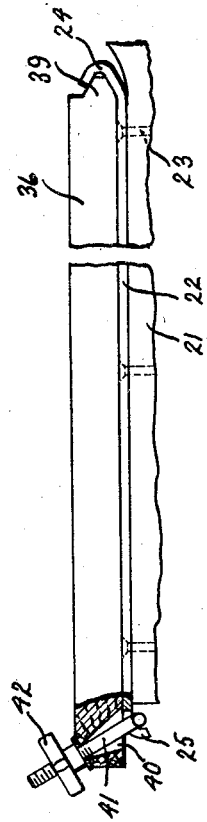

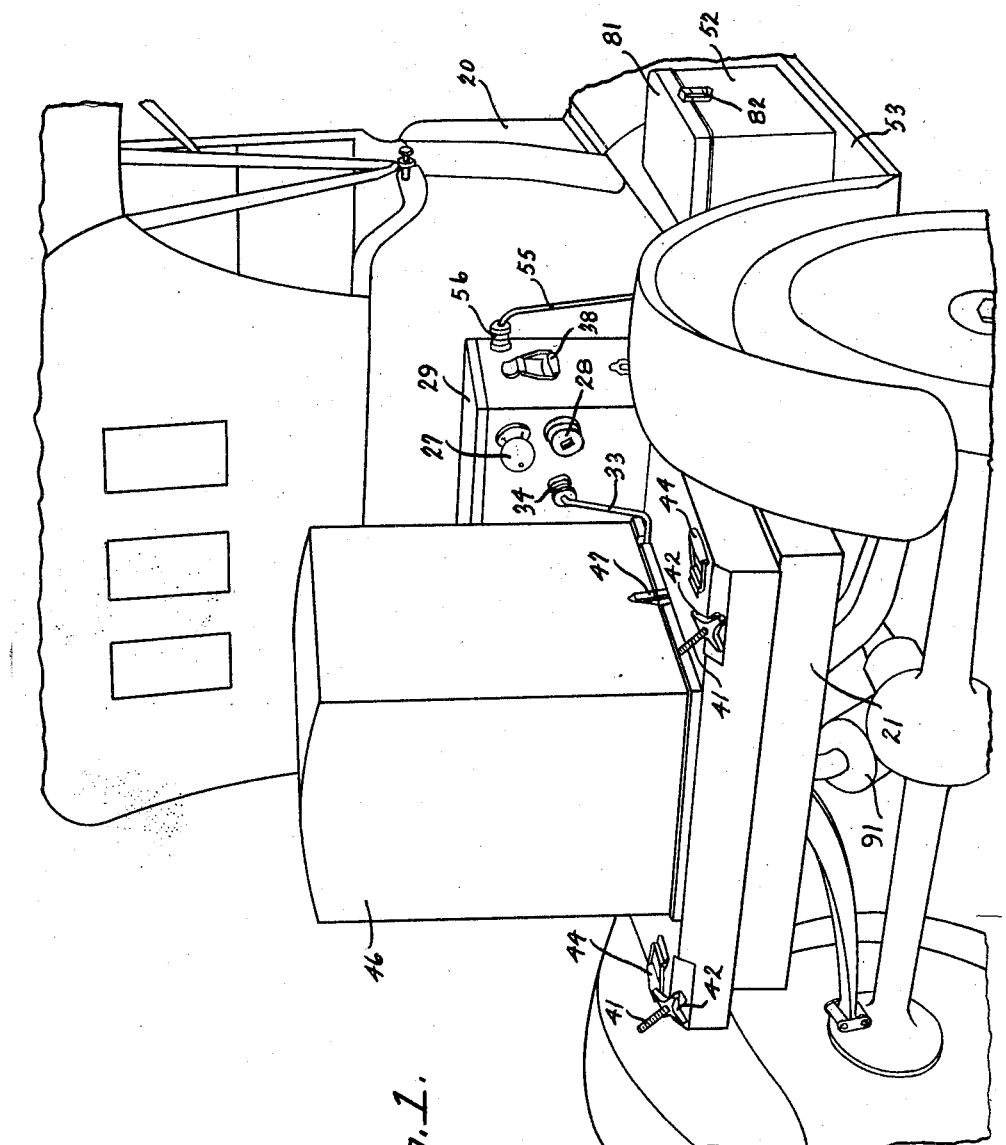

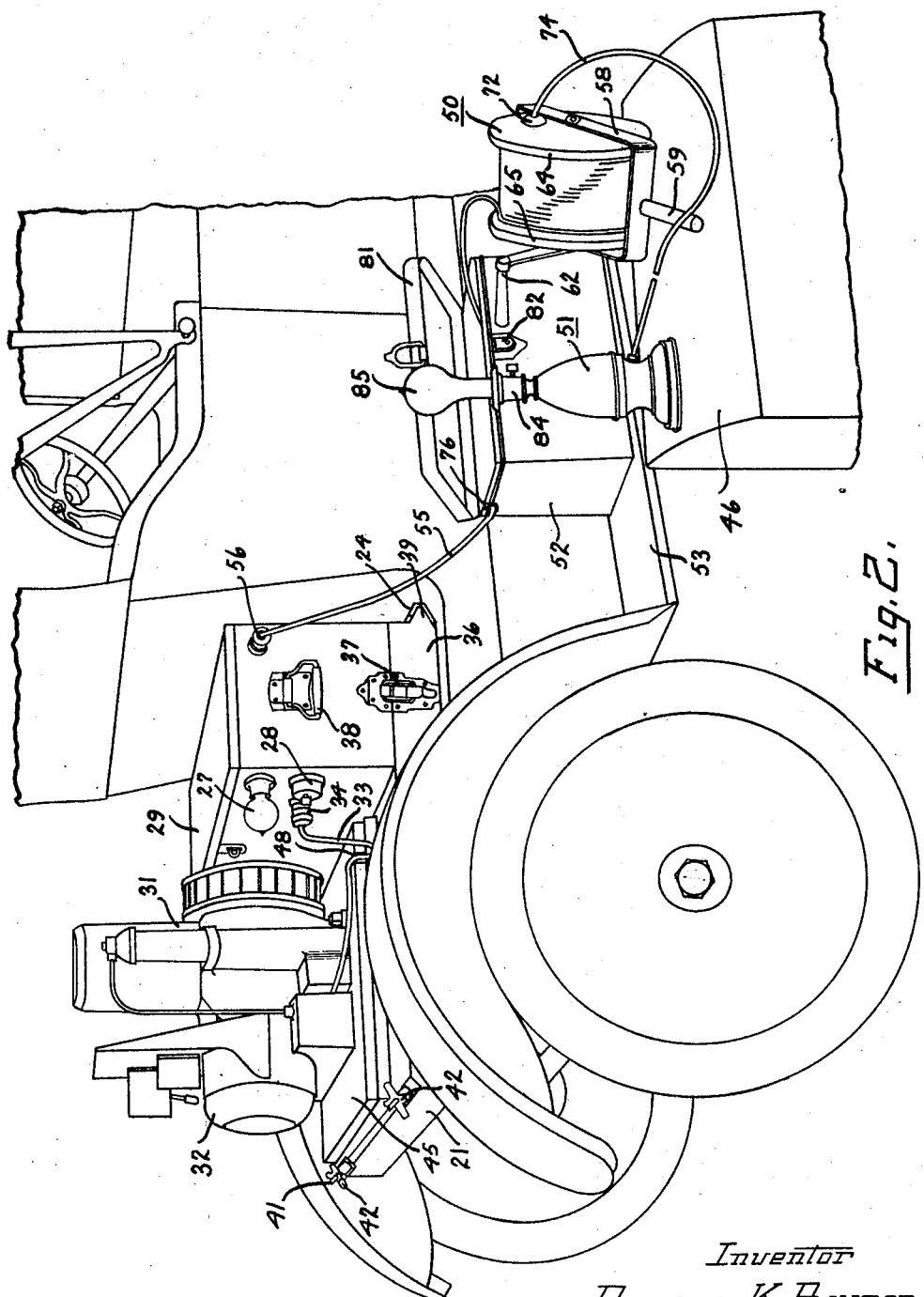

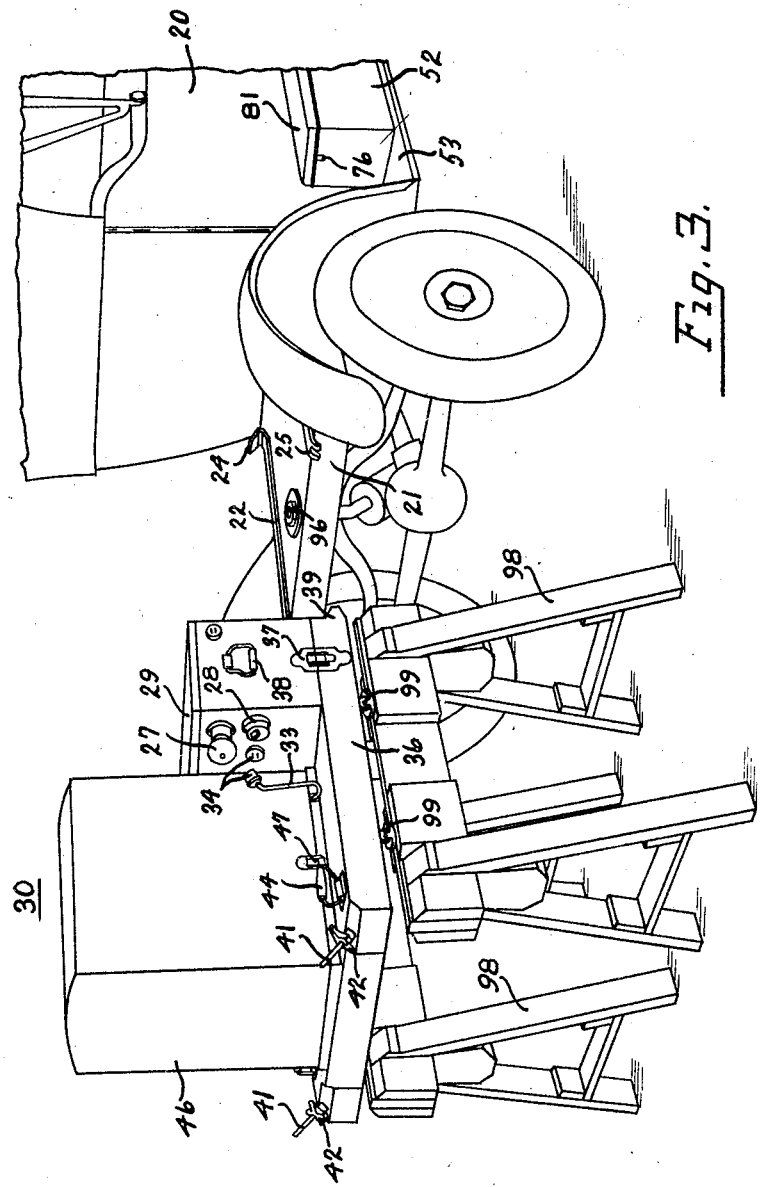

Patented Oct. 15, 1929

1,731,521

UNITED STATES PATENT OFFICE

DONALD K. BAXTER, OF DAYTON, OHIO, ASSIGNOR TO DELCO-LIGHT COMPANY, OF DAYTON, OHIO, A CORPORATION OF DELAWARE

ELECTRICAL APPARATUS

Application filed June 23, 1923. Serial No. 647,306.

The present invention relates to portable demonstrating apparatus and particularly to an apparatus for demonstrating an electrical generating unit.

One of the objects of the present invention is to provide a demonstrating apparatus which may be carried by a vehicle, the apparatus and vehicle being constructed so that the apparatus may be readily removed therefrom or readily attached thereto.

Another object of the invention is to provide a demonstrating apparatus which may be carried by a vehicle and in which the apparatus will be operative for demonstrating purposes when attached to the vehicle or when removed therefrom.

A still further object is to provide a demonstrating apparatus which can be attached to or removed from a vehicle as a unit or as separatable portions which can be readily assembled or detached.

Other and further objects of the present invention will be apparent from the following description, reference being had to the accompanying drawings wherein a preferred embodiment of one form of the present invention is clearly shown.

In the drawings:

Fig. 1 is a fragmentary perspective view of an automobile with the present invention applied thereto;

Fig. 2 is a fragmentary perspective view of an automobile and the demonstrating apparatus attached thereto with some of the covers of the apparatus removed;

Fig. 3 is a fragmentary perspective view of an automobile and apparatus showing the demonstrating apparatus removed from the automobile;

Fig. 4 is a fragmentary side view partly in section of portions of the automobile and demonstrating apparatus base showing the method of attaching the demonstrating apparatus to the automobile;

Fig. 5 is a fragmentary view partly in section showing an automobile part and muffler for the internal-combustion engine used in the demonstrating apparatus, showing the method of attaching the engine exhaust pipe to the muffler;

Fig. 6 is a sectional view of a container for a wire reel and lamp, the lamp being shown in section with the lamp bulb in position when the demonstrating apparatus is not in use; and Fig. 7 is a sectional view of the reel taken on line 8—8 of Fig. 7.

Referring to the drawings, 20 is an automotive vehicle having a platform 21 carrying rails 22 secured by screws 23. Adjacent the seat back of the automobile, rails 22 are provided with hooks 24. Rails 22 extend beyond the rear end of the platform 21 and are provided with downwardly extending hooks or forks 25.

The demonstrating apparatus comprises a power plant 30 which includes a dynamo electric machine comprising an internal-combustion engine 31 and a motor generator 32. Motor generator 32 operates as a motor for cranking the engine 31; and, after the engine becomes self-operative, it drives the motor generator as a generator. The power plant also includes a battery enclosed within a battery box 29. This battery is charged by the generator 32 and is adapted to furnish current to the motor generator for cranking the engine 31. Motor generator 32 is connected by a wire 33 to the battery box 29 by plug and socket connection 34. One or more bulbs 27 are carried by the battery box 29 and are electrically connected with the battery and controlled by a switch 28 also carried by said box. The power plant is mounted upon a base 36, the battery box 29 being detachably secured by latches 37 and said box 29 is also provided with handles 38. The front end of the base 36 has a tapered edge 39 which conforms to the curvature of the hook 24 of rail 22. When the base 36 is mounted upon the automobile the hook 24 prevents the upward and forward movement of the front end of the base. The rear end of the base 36 is provided with holes 40, each for receiving a T-bolt 41 having its T-head extending below the base, and having the shank portion thereof fitted between the prongs of the fork 25 and the T-head thereof engaging the underside of the fork. The bolt 41 cooperates with a hand screw 42 for clamping the base 36 between the rail and said screw 42. The T-bolt 41 and the hand screw 42 cooperate with the edge 39 and hook 24 for securing the base 36 in position on the body 21. The base 36 is provided with handles 44.

The power unit is mounted upon a base 45 supported by base 36, and is provided with a cover 46 secured to base 45 by latches 47. Base 45 has a slot 48 which extends below the bottom of the cover 46 for receiving the wire 33 whereby the cover 46 can be removed without disturbing the electrical connection between the motor generator 32 and the battery.

The demonstrating outfit also includes a wire reel 50 which carries wire 55, and a lamp 51. Reel 50 and lamp 51 are carried within a box 52 which is secured to the running board 53 of the automobile. The lamp 51 is connected with the battery through wire 55, and plug and socket connection 56 provided upon the battery box 29.

Referring more particularly to Figs. 6 and 7, the reel 50 includes a bracket 58 having a handle 59 which is adapted to receive a bolt 60 and an oppositely disposed spindle 61 which merges into a crank handle 62. The spool of the reel is provided with side walls 64 and 65 and a hub 66. Hub 66 is hollow and is provided with an opening 67. The side wall 65 is secured to the spindle 61 by a nut 70 and the side wall 64 is fulcrumed upon the bolt 60. Rotation of the handle 62 will cause the rotation of the spool within the bracket 58. The side wall 64 carries a socket 71 adapted to receive a plug 72. Socket 71 extends within the hub 66 and one end of wire 55 extends through the opening 67 and is connected with said socket. A wire 74 is connected to the plug 72 and with the lamp 51.

In using the lamp the plug 72 is first disconnected from the socket 71, and the reel 50 is grasped by the handle 59, and when moved away from the box 52 causes the wire 55 to be unreeled. When the attendant reaches the place where he wishes to make his demonstration with the lamp, the plug 72 is inserted within the socket 71 thereby connecting the lamp socket 84 with the battery. The wire 55 may again be wound upon the reel 50 by rotating the handle 62 after the plug 72 has been removed. The battery box 52 is slotted as at 76 to receive a non-conducting guide 77 through which the wire 55 passes and to which the wire is secured. The guide 77 carrying the wire 55 can be removed through the slot 76. Guide 77 functions as an insulator for the wire 55 where said wire passes through the box 52 and also is adapted to relieve the plug and socket connection 56 on the batery box 52 of some of the stresses to which it is subjected when the wire 55 is being wound or unwound so that the plug will not become disconnected from the socket. Box 52 is provided with a cross bar 79 having a slot 80 within which the handle 59 of the reel 50 is adapted to rest when located within the box. The bar 79 is so positioned within the box 52 that the handle 59 will be engaged by a lid 81 of the box 52 when said lid 81 is locked in position by latch 82 whereby the movement of the reel within the box 52 is limited.

The lamp 51 is provided with a hollow base 83 through which the wire 74 passes. The upper end of the lamp 51 is provided with a live socket 84 adapted to receive the bulb 85 and to which the wire 74 is connected. Socket 84 is secured in position by a screw 85 which also carries at its lower end a dummy socket 87 which is also adapted to receive the bulb. The height of the lamp 51 with the bulb removed is substantially the same as the interior height of the box 52 including the lid 81 so that when the lid 81 is locked in position it will clamp the lamp 51 between said lid 81 and the bottom of the box thereby preventing movement of same. Before the lamp is located within the box 52 the bulb 85 is screwed within the socket 87. In this maner the base 83 carries the bulb 85 and functions as a guard therefor.

Referring particularly to Figs. 3 and 5 the internal-combustion engine is provided with an exhaust pipe 90 which is connected to a muffler 91. The platform 21 of the automobile has an opening 92 covered by a plate 93 secured by bolts 94. Muffler 91 is connected with a pipe 95 which in turn is coupled with an exhaust pipe socket 96 by coupling 97. Socket 96 is clamped to the plate 93 by clamping nuts 100. Exhaust pipe 90 is flexible and slides within the socket 96 whereby the pipe 90 may be readily disconnected when it is desirable to remove the power plant.

One of the advantages of the present invention is the facile removal of the demonstrating apparatus from the automobile. The hand screw 42 is unscrewed until the head of the T-bolt 41 can clear the lower end of the fork 25. The flexible exhaust pipe 90 is removed from socket 96. Then the handles 44 on the base 36 are grasped and the base 36 is slid upon the rails 22. If desirable the battery box 29 can be unlatched and removed separately.

The elements of the power plant are arranged advantageously to one another and to the vehicle. By placing the box 52 for the lamp and reel on the running board of the vehicle and the battery adjacent the front of the platform, these elements are brought close to one another whereby they can be readily connected. And since it is desirable that the muffler of the engine 31 be located near the rear of the vehicle, the engine 31 is arranged adjacent the rear of the platform, there being angle room provided between the battery box and the engine whereby the electrical connection can be readily made. Also by locating the dynamo electric machine adjacent the rear of the platform, access may be had to said machine from the rear of the vehicle. In this manner all the elements are located so that they can be readily demonstrated while the power plant is on the vehicle.

The demonstrating apparatus is usually used by salesmen, and it is often desirable to leave the demonstrating apparatus at the home of a prospective purchaser. In such case, the power plant, lamp, and reel can be removed as a unit. If the salesman desires to use the automobile for other purposes, horses 98 substantially the same height as the platform 21 of the car can be provided upon which the power plant can be readily placed. These horses are provided with rollers 99 upon which the base 36 of the power plant may slide.

It will be noted that with the plug and socket connection 34 the power plant can be removed as a unit without disturbing the electrical connection between the motor generator and the batteries while at the same time said connection when separated permits the removal of the battery or the electric machine independently of one another.

Advertising matter can be placed upon the cover 46 of the electric machine and the sides of the cover illuminated by the bulbs 27.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. Demonstrating apparatus and means for conveying same including a vehicle having a rear platform, a base removably secured to the platform, a dynamo-electric machine carried on said base adjacent the rear of the platform, said machine including an internal combustion engine, a muffler for said engine carried on the underside of said platform, and means for detachably connecting the engine and muffler whereby said base and said machine may be removed from said platform, said means including a pipe member and a cooperating socket member, one member being carried by the engine and the other by the platform.

2. Demonstrating apparatus and means for conveying same including a vehicle having a rear platform, a base removably secured to the platform, a dynamo-electric machine carried on said base adjacent the rear of the platform, said machine including an internal combustion engine, a muffler for said engine carried on the underside of said platform, and means for detachably connecting the engine and muffler whereby said base and said machine may be removed from said platform, said means including a flexible pipe carried by the engine and a cooperating socket carried by the platform.

3. In a demonstrating apparatus, the combination with a vehicle having a platform, of an internal combustion engine, a muffler for said engine carried by the platform, and means for detachably connecting the engine and muffler whereby said engine may be removed from said platform, said means including a pipe member and a cooperating socket member, one member being carried by the engine and the other by the platform.

4. In a demonstrating apparatus, the combination with a vehicle having a platform, of an internal combustion engine, a muffler for said engine carried by the platform, and means for detachably connecting the engine and muffler whereby said engine may be removed from said platform, said means including a flexible pipe carried by the engine and a cooperating socket carried by the platform.

In testimony whereof I hereto affix my signature.

DONALD K. BAXTER.